Jan. 28, 1964     M. J. KAHAN     3,119,695
PRESSURIZED LIQUID INSTANT COFFEE
Filed Oct. 5, 1961

INVENTOR.
MORTIMER J. KAHAN
BY
ATTORNEY

3,119,695
PRESSURIZED LIQUID INSTANT COFFEE
Mortimer J. Kahan, Whitestone, N.Y., assignor to Glamorene Industries Factors, Inc., Clifton, N.J., a corporation of New York
Filed Oct. 5, 1961, Ser. No. 143,089
4 Claims. (Cl. 99—79)

This invention concerns a process for packaging liquid instant coffee concentrate and the packaged product produced thereby, and is a continuation-in-part of my copending application, Serial No. 830,518, filed July 30, 1959, now abandoned.

According to the invention there is provided an apparatus and process for packaging a pure liquid instant coffee concentrate in a pressurized container using gas as a propellant in conjunction with an aerosol dip tube and valve so as to create a new basic method of rapidly dispensing liquid instant coffee.

Heretofore in the growing, roasting and brewing of coffee there has existed a constant and continued effort to perfect a method and means for enclosing and preserving the flavor and aroma of roasted ground coffee within a container so as to prevent almost immediate rapid decomposition and deterioration of the volatile coffee essences and oils because of exposure to oxygen in air.

For many years prior to the discovery of vacuum packed coffee the common practice generally in the sale of coffee for public consumption was the accepted method of roasting several bags of coffee beans which were usually distributed through grocery stores. The roasted coffee beans sacked in the original jute bags were blended together and ground for distribution and further resale at retail. In a period of seven to ten days cafoil, or coffee oil, generally appeared on the whole roasted coffee beans and a progressive stage of oxidation and dispersal of these volatile oils, which caused the oils to turn rancid, began to affect the flavor and aroma of the coffee beans. These whole roasted beans, which were exposed generally for several weeks, would begin to further deteriorate quite rapidly after being ground and further exposed to oxygen in air.

With the advent of packing roasted ground coffee in cans under a 25" to 27" Hg vacuum it became possible to preserve roasted coffee for a period of six to eight months. After that length of time the volatile substances contained in the roasted ground coffee and the $CO_2$ gas carrying the aromatic essence and aroma would arise to the top of the can. Upon opening the vacuum packed coffee the $CO_2$ gas and aromatics would be quickly carried away in the atmosphere. The coffee, upon being exposed to oxygen, began an immediate drying out and staling process and a progressive loss of flavor and aroma which resulted in a stale acrid bitter taste after five to seven days from the time the vacuum packed can of coffee had been opened.

Air itself adversely affects roasted ground coffee, dissipating its aroma which is at least fifty percent of the flavor, reducing its delicate acidity which contributes to and accentuates its superior winey flavor and aids in the penetration of milk solids additives. In a comparatively short period of exposure to air the inevitable staling process creates a musty medicinal aroma in the roasted ground coffee which results in a harsh flat brew resembling a licorice flavor.

An attempt was made heretofore to market a pure liquid coffee concentrate in conjunction with a quick freezing process. An instant coffee in liquid form was subjected to freezing at below zero temperature to insure stability, freshness and preservation of flavor and aroma. The liquid coffee on being purchased by the housewife was thawed and placed under ordinary refrigeration. Here again the process of staling and oxidation resulting from exposure to oxygen in the air when the jar of liquid coffee was opened resulted in deterioration and extreme loss of flavor after three days. This type of quick frozen coffee was never a commercial success and was subsequently withdrawn from the market. This frozen liquid coffee had other difficulties beside oxidation and instability. The acidity count on a pH meter would increase from 4.9 to 3.7 which indicated a definite spoilage tendency because of high water content and exposure to bacteria. It was necessary to spoon the coffee from the narrow neck of a jar which in turn caused a general messy, unwholesome and unpleasant condition when the liquid coffee concentrate spilled over the glass jaw screw threads. If the screw cap was replaced without first wiping the jaw threads the liquid coffee became gummy and acted as a glue to prevent the further removal of the screw cap. In many cases drastic measures were used to loosen the cap. The resultant loss of flavor and aroma in a short time combined with continued messy annoyance and aggravation caused the use of frozen concentrated coffee to be abandoned.

Many other attempts to introduce liquid concentrate coffee to the public were made but in each case, exposure to oxygen in the air, and lack of stability, caused a dissipation of the delicate volatile flavor oils and a loss in flavor and aroma.

The usual method of preserving these prior coffee concentrates was either flash pasteurization or continuous gradual pasteurization and rapid cooling in the glass or can container. This cooking process had the effect of introducing a foreign flavor to the coffee concentrate caused usually by carmelizing the carbohydrates in the coffee, which resulted in a molasses candy off-flavor and a destruction of the natural coffee aroma.

Many coffee concentrates pasteurized to 190 deg. F. are filled into 46 oz. cans and distributed to vending machine operators for use in dispensing coffee in automatic mixing, measuring valve coffee vending machines. These coffee concentrates are either filled hot or pasteurized in the container, but the resultant coffee products bear little resemblance to true freshly roasted and freshly brewed coffee. Excessive heat temperatures and subsequent exposure to air results in a coffee concentrate closely resembling soup broth or licorice candy.

Many efforts have been directed to perfecting dehydrated powdered instant coffee because of a certain similarity in aroma and flavor to brewed coffee. In order to obtain a 22% to 25% soluble solids concentrate required for dehydration, the usual method of extraction involves a battery of six large extractors employing 260° F. superheated water pumped from one extractor to another. In attempts to obtain a higher yield of soluble solids from the roasted coffee, use of greater pressures and higher temperatures of superheated water have managed to achieve 32% to 34% soluble solids extraction per pound of roasted coffee. However, greater yields of solids have tended to destroy the original coffee flavor and aroma. The higher extraction and greater yields draw off the oils and undesired tars inherent in roasted coffee which must be removed by centrifugal clarification. This further tends to thin and weaken the original volatile flavor essence.

The powderization process of spray drying dehydration where the centrifuged superheated coffee concentrate is held under pressure and then atomized through nozzles in a vertical extended chamber employing a partial vacuum has a further tendency to create a synthetic licorice flavor foreign to freshly brewed coffee. Inlet temperatures on these spray dryers vary with the height of the chamber but usually run from 290° F. to 370° F. Even though the drying chambers are held under a partial vacuum a carmelizing of the coffee carbohydrates takes place and results in imparting a peculiar sweet aftertaste usually found after a cup of this instant coffee has been consumed.

A great deal of the natural delicate fragrance and aroma is lost through dehydration and the resultant brew in many cases possesses a harsh, bitter, burned flavor unlike brewed coffee.

Air also adversely affects dehydrated coffee. A jar of powdered instant coffee completely sealed with its paper gasket and metal cover will remain stable for four to six months. However, as soon as the glass jar is opened, oxygen in the air begins to cause a dissipation of aroma and flavor and because dehydrated coffee is extremely hygroscopic, moisture will be drawn from the humidity, and depending on dampness a jar of powdered coffee may become a sodden gummy glob of coffee concentrate beyond use within two or three weeks. Oxygen also tends to destroy any remaining aroma and flavor and causes excessive staleness and bitterness.

Through the use of my invention it is now possible for the first time to fill an aerosol container with pure fresh liquid instant coffee having none of the aforedescribed undesirable qualities and through the procedure herein described of drawing a high vacuum and pressurizing the filled container with nitrogen or other suitable gas to preserve the liquid instant coffee concentrate for a period of nine months or longer at 50 to 60 deg. F., and then to dispense all the coffee by the teaspoon for individual servings of a cup of coffee without any air, oxygen, dust, bacteria, foreign substance or any other matter coming in contact with the pressurized liquid instant coffee until all the coffee in the aerosol container has been entirely consumed.

My invention further relates to the fact that it is the only coffee that remains completely sealed until entirely consumed, thus insuring a continuous just-brewed flavor from first cup to last cup.

The principal object of this invention involves a process for making a pure liquid instant coffee concentrate under conditions which result in a natural coffee flavor and aroma, and then immediately packing the concentrate in a dispensing container under conditions precluding changes in the concentrate so long as any of the concentrate remains undispensed.

A further object of the novel process according to the invention is to utilize an aerosol valve with a plastic dip tube, and/or a metering valve with similar dip tube construction, or upside-down aerosol valve similar to the valves used to dispense whipped aerosol cream. These valves are used in conjunction with a suitable plastic lined rigid container for the express purpose of creating an aerosol coffee dispensing package which will facilitate dispensing liquid instant coffee in a continuous stream, spray or metered amount and act as a means of preventing oxidation, deterioration and decomposition of the liquid instant coffee.

Another object is to provide a suitable aerosol rigid container in conjunction with either a normal, regular aerosol valve with dip tube, or upside-down valve or metering valve and in conjunction with a suitable gas propellant which may be nitrogen or any other gas propellants which will be safe, stable, non-toxic, non-flammable, and non-corrosive to the aerosol container and which will be compatible with liquid instant coffee and will not create an undesirable side odor foreign to coffee. Commercially pure nitrogen gas has proven to be extremely successful, and this invention relates particularly to the use of nitrogen in connection with concentrated liquid instant coffee. Pure nitrogen acts as a protective blanket shield and as an excellent preservative for the liquid instant coffee, preserving its flavor and aroma over a long period of time.

Another object is to provide a liquid instant coffee in a pressurized container which will maintain a stable pH or acidity for 90 to 120 days without refrigeration.

A further object is to provide for the packaging of a liquid instant coffee in a pressurized container which after 90 to 120 days may be stored under refrigeration at 35 degrees F. to 65 degrees F. to insure and maintain sterility, with no flavor or aromatic deterioration, a stable pH with no bacterial infection in a pure concentrated liquid instant coffee, and which when pressurized and stored at the refrigerated temperatures mentioned above will remain stable, constant, and fresh, retaining all its original freshly brewed flavor, taste, aroma and color over a period of up to two years.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

In the several figures, like elements are denoted by like reference characters.

Figure 1:
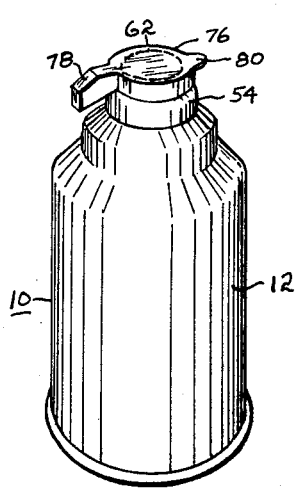
FIGURE 1 is a perspective view of an aerosol container employed in practicing my invention.
Figure 3:
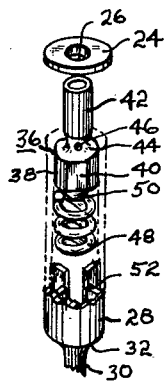
FIGURE 3 is a spread perspective view of an aerosol container valve, parts being shown broken away.
Figure 2:
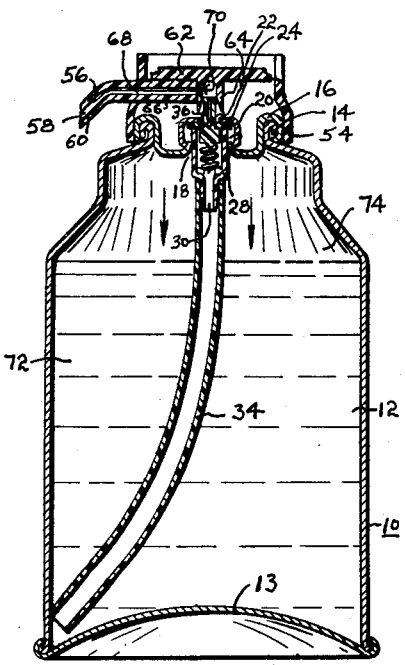
FIGURE 2 is a longitudinal sectional view of the container, on an enlarged scale, with liquid coffee concentrate shown therein, the valve parts being shown in inoperative position, parts being omitted.

FIGURES 1 and 2 show a container 10 which has a generally cylindrical body 12 closed at the bottom by a concavo-convex bottom wall 13 and open at the top, with a beaded neck 14. The open top of the container is closed by a cup-shaped metal cover 16, the edge of the flange of which is snapped over the beaded neck 14 of the container. Cover 16 is formed with a central opening 18 and snapped over the upturned edges of the opening 18 is an inverted cup-shaped cap 20 with a central opening 22 in the base thereof. A paper gasket 24 with an opening 26 centrally thereof is disposed inside the cap 20 against the inner surface of the base thereof. A plastic tubular member 28 extends through the opening 18 in the cover 16 and at one end seats against the gasket 24. The other end of the tubular member is formed with a reduced portion 30 providing a shoulder 32, said end depending into the interior of the container. One end of a plastic dip tube 34 is placed over the reduced portion 30 and seated against the shoulder 32. The dip tube depends from the tubular member 28 and extends to the bottom of the container, the bottom end of the tube being open.

An elongated valve member 36 is slidably mounted in the tubular member 28. The valve member has a solid cylindrical body portion 38 with opposed flat sides 40. The body is formed with a tubular extension 42 reduced in diameter providing a shoulder 44. The tubular extension extends through the opening 22 in the base of the cap 20 to the outside thereof. A small radial hole 46 is formed in the wall of the tubular extension 42 at its juncture with the body 38. A coil compression spring 48 is interposed between the body 38 and the tubular member 28, one end of the spring seating on a rounded protuberance 50 centrally of the bottom end of the body 38 as viewed in FIGURE 2, and the other end seating on shouldered ribs 52 formed on the shouldered portion 32 of the tubular member 28. The spring normally urges the body portion 38 of the valve member upwardly so as to seal off the hole 46 in the valve member 36 from communication with the interior of the container.

A spout and actuator assembly is mounted on the beaded portion of the flange of the cover 16. This assembly is formed of plastic and comprises a collar 54 snapped over the flange portion of the cover 16 and is provided with an integral spout 56 extending laterally and radially thereof and having a passage 58 and a slanting outer discharge end 60. The collar is cut away at its upper edge opposite the spot 56.

A circular plastic actuating button 62 is hingedly mounted in the collar 54 at the top thereof. The button is formed with a central depending tubular hub portion 64. Extending radially from the hub portion on the undersurface of the button to the collar 54 is a flexible tubular enlargement 66, the outer end of the tubular enlargement extending through as opening in the collar 54. The outer end of the tubular enlargement and the opening in the collar serve as a hinge connection between the button and collar. The passage 68 in the tubular enlargement 66 communicates at one end with the passage 58 in the spout 56 and at the other end with a radial opening 70 in the wall of the hub portion 64. The hub portion 64 of the button is sleeved over the tubular extension 42 of the valve member whereby communication is established between the valve member 36 and the spout 56.

In operation, the container 10 is filled up to a maximum of about 80% of the volume of the container with concentrated liquid coffee concentrate 72. A headspace 74 above the surface of the coffee concentrate is filled with nitrogen gas under a pressure of 90–130 pounds per square inch. The concavo-convex bottom wall 13 resists the high pressure under which the contents of the container are maintained. A removable transparent cap or cover top 76 of transparent semirigid plastic shaped to conform to the top of the spout and actuator assembly is placed over the top of said assembly and includes an extension 78 to cover the spout 56. The cover is provided with a finger piece 80 to facilitate removal. The cover seals the spout and actuator assembly and the contents from air, dust and other foreign matter.

Upon removal of the cover 76 inward directed pressure on the botton 62 forces the valve member off of its seat against the gasket 24 thereby bringing the opening 46 in the tubular extension 42 of the valve member into communication with the interior of the tubular member 28. Pressure of the nitrogen gas upon the surface of the coffee concentrate causes the coffee concentrate to be forced upwardly through the dip tube 34 through the tubular member 28, upwardly along the flat sides 40 of the body 38 of the valve member, through the opening 46, through the tubular extension 42 of the valve member to the interior of the hub portion 64, out through the opening 70 in the hub portion to the passage 68 in the enlargement 66 on the bottom of the button 62. From passage 68 the coffee concentrate passes through the passage 58 in the spout 56 to the spoon.

Figure 4:
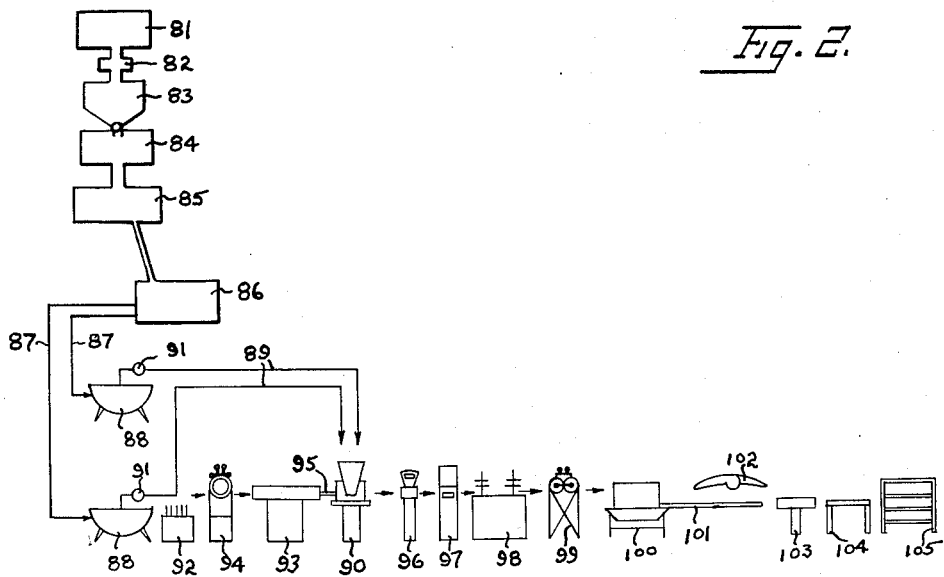
FIGURE 4 is a diagrammatic showing of a process and apparatus employed in producing aerosol container packaged coffee according to my invention.

In order to produce the aerosol package of coffee concentrate shown in FIGURES 1 and 2 there is employed a process and apparatus shown schematically in FIGURE 4.

The novel process contemplates, among other things, a continuous flow sequence of steps beginning with roasting of the coffee beans followed thereafter by the remainder of the process steps and terminating with the finished sealed container of coffee concentrate. The first part of the process, which is concerned with the preparation of the liquid coffee concentrate, is fully described in my issued United States Patent 2,874,629. A brief summary of this portion of the process is as follows: Freshly roasted coffee from the vessel 81 is delivered to the mill 82 where it is suitably ground and then delivered to the storage bin 83. The ground coffee is then transferred as required to the retort 84 where it is steamed preparatory to its deposit in the extractor 85. Extraction of the concentrate from the steamed ground coffee is carried out in the extractor with water at a temperature of approximately 180° Fahrenheit. The extracted concentrate is collected by a receiver 86 and transferred therefrom via stainless steel piping 87 to a plurality of stainless steel holding tanks 88 with covers and sanitary fittings.

While the coffee concentrate delivered from the extractor 85 retains the flavor and aroma qualities of freshly roasted coffee and does not contain the undesired gums and tars the presence of which result in a harsh, bitter or otherwise unnatural coffee flavor, nevertheless, the integrity of the concentrate cannot be preserved if allowed to remain in contact with the air since the extracted desired oils present in the concentrate will eventually begin to turn acidic. It is therefore important to package the concentrate as soon after extraction as possible in a manner which excludes contact of the air therewith. By so doing, the integrity of the concentrate can be preserved for periods of time upwards of one year. The concentrate is therefore transferred to the holding tanks 88 for packaging. These holding tanks 88 are used primarily to equalize and stabilize the soluble solids determination at 30 Brix reading on standard refractometers and to determine a true refractive index reading allowing for temperature corrections. The holding tanks act as storage means from which pure fresh concentrated liquid instant coffee that has just been freshly extracted as previously described is immediately pumped through stainless steel pipes 89 to filling machine 90.

Stainless steel pumps 91 with stainless steel rotor blades and by-pass are provided. The pumps are capable of pumping the freshly extracted pure concentrated liquid instant coffee without foaming through stainless steel pipes 89 to filling machine 90.

An air cleaner 92 employing jets of compressed air in combination with vacuum serves to dislodge, draw-off and clean all dust and other particles which may be present in the aerosol cans prior to heat sterilization. An unscrambler can machine 93 moves the sterilized cans rapidly from autoclave sterilizer 94 to the conveyor track 95 of the filling machine. In the autoclave or similar sterilizing unit 94 the metal or other containers 12 and aerosol valve members 36 and tubes 34 are subjected to dry heat in a totally enclosed chamber at 180 degrees F. to 200 degrees F. for a period of two to three minutes to completely heat and sterilize container and valve components. Moist live steam in the autoclave may also be used to sterilize the container and valve components.

A piston type volumetric filling machine 90 with all parts constructed entirely of stainless steel where said parts contact the concentrated liquid coffee is used to fill the sterilized containers. A scale device 96 is used to accurately check-weigh the contents of each can after the can is filled with a proper amount of coffee concentrate. The valve assembly and valve components are inserted into the aerosol container after the container has been filled and check-weighed. A machine 97 with either a built-in hydraulic unit or activated by an air compressor which will deliver sufficient thrust, approximately 960 lbs., is used to firmly crimp the valve assembly onto each aerosol can.

A vacuum pump and motor 98 of sufficient power to evacuate all the air from the crimped aerosol container, which has previously been filled with pure fresh concentrated coffee, is used to draw a 22″ to 29″ Hg vacuum through the crimped valve dip tube 34 of the inverted can, thus completely evacuating and exhausting all the air trapped in the filled crimped can.

In conjunction with aerosol valve crimping device 97 it is also posible to use in my invention a housing chamber vacuumizing device. This device is lowered to the container shoulder and with a suitable rubber or plastic gasket forms a complete seal. Thus, it is possible to draw a 22″ to 29″ Hg vacuum within the open container that contains the concentrated liquid instant coffee, aerosol valve and dip tube before the valve assembly is crimped onto container 10. By additionally purging the filled container with nitrogen gas after drawing a preliminary 25" Hg vacuum, a further second vacuum may be drawn within the sealed housing and filled container, drawing a full 27" to 29" Hg vacuum within the container. With this full vacuum in effect, the crimping head device actuated by compressed air descends within the vacuumized housing chamber and then firmly crimps the valve assembly onto the top of the aerosol filled body 12 of the container. Depending on the number of vacuum crimping heads it is possible in an automatic rotary machine with twelve to sixteen vacuum and crimping heads working intermittently to completely evacuate air from within the filled container drawing a full 29" to 29½" Hg vacuum, and to completely crimp valves onto containers at speeds of 160 per minute to 300 valves per minute.

The apparatus includes an automatic manifold rotary gas pressurizing machine 99 with twelve to sixteen pressurizing heads. The machine may employ nitrogen, $CO_2$ gas, nitrous oxide, liquified fluorinated hydrocarbon or any other suitable gases. The machine will pressurize filled vacuumized aerosol containers at speeds of 160 cans per minute to 300 cans per minute with the proper amount of gas pressure which has previously been regulated and adjusted. The gas will act as a suitable propellant at the proper pressure to dispense all the fresh concentrated liquid instant coffee when the valve member 36 is actuated. It is possible to provide a single or double hand-operated gas regulator and valve with adjustable coupling and nipple which can be directly connected to standard tanks of gas and which will act as a hand-operated semi-automatic pressurizing device to perform essentially the same action as an automatic rotary gasser. The gas regulator may have two gauges, one gauge to reduce the gas pressure in the tank from 2200 lbs. to workable pressure of approximately 200 lbs., and the other gauge to regulate the exact number of pounds of gas from 90 lbs. to 130 lbs. of gas pressure necessary to pressurize the filled air evacuated aerosol container with the proper amount of gas at the pressure necessary to dispense all the concentrated liquid instant coffee in the aerosol container.

This same gas under pressure acts as a preservative blanket and helps to maintain and hold stable the true aroma, rich flavor and taste of the original pure fresh concentrated liquid instant coffee over an extended period of time up to two years.

A device or machine 100 is used to automatically test the predetermined pounds of gas pressurized in the aerosol container and if the container is not properly pressurized with the exact amount of gas to automatically reject the container on a by-pass star wheel arrangement. An additional testing apparatus may be used to partially actuate the valve member 36, drawing up one or two drops of concentrated liquid coffee to test that the valve and valve assembly and valve dip tube 34 are functioning properly, and that the valve dip tube has not become disengaged from the valve tubular member 28 and further that the gas pressure is properly functioning to insure a proper flow and proper dispensing through the valve member 36.

The leak testing apparatus 100 may include a stainless steel water bath of 6 ft. to 30 ft. in length, the length of the bath to determine the number of cans per minute from 15 cans to 300 cans per minute production desired. The stainless steel water bath may be worked in conjunction with a magnetized stainless steel conveyor belt which holds cans in position while being moved down incline into water bath for leak testing and then being moved along conveyor track. The filled pressurized container moves under water for a distance of 4 to 8 feet, the speed of belt depending on number of cans for desired production per minute and water bath serves to detect any leak of gas because of improper crimp or gas leak at can seam or gas leak through valve stem orifice.

The stainless steel sink with movable track may be powered by water hydraulic valves, with overflow float valve pump and motor to control and regulate continuous flow of water in conjunction with a pump and motor to build up water pressure in the lines to 40 to 50 lbs. of water pressure. This pressure is necessary for proper functioning of water hydraulic valves which will raise and lower the can filled track into the water bath for gas leak detection. When the track is raised after can inspection, the cans are moved off the track and onto a dryer belt and a new batch of cans is moved onto the track, then lowered into bath for inspection.

A conveyor belt 101 is connected to the water bath. At the belt are two turbine blowers 102 with sheet metal ducts and enclosed heating elements positioned directly opposite each other for quickly blowing off and drying wet, filled pressurized aerosol containers.

An accumulator turntable 103 is provided for dried, filled aerosol cans moving off dryer conveyor belt 101. The cans are then moved on to a stainless steel table 104 for applying of valve spouts 56 and dust caps 76. The completed cans may then be stored in storage rack 105 until packed for shipment.

This packaged container of pure, fresh concentrated liquid instant coffee will keep fresh and maintain a stable pH and remain sterile without any signs of decomposition or bacterial infection if kept in a storage temperature of 35 to 65 degrees F. The sealed container will hold a pure liquid instant coffee completely stable over a period of up to two years without any loss of flavor and aroma due to oxidation. The coffee will remain pure and fresh retaining the delicate fragment aromatic volatile oils, rich full bodied flavor and taste of freshly roasted, freshly ground and freshly brewed coffee, and true color and appearance of fresh coffee when 5 to 7 cc. of such above described aerosol packaged coffee is mixed with a 5½ oz. cup of boiling water.

The aerosol cans operate to release a flow of concentrated liquid instant coffee forced by gas pressure down and into the dip tube 34 and out through the valve member 36 to spout 56 into a teaspoon. If a metered type of valve is used, a regulated measured amount of liquid instant coffee will be released up through the dip tube and valve stem itno a coffee cup directly without requiring a measuring teaspoon.

Having now described my invention in connection with particularly illustrated embodiments thereof, it will be appreciated that variations and modifications will naturally occur from time to time to those persons normally skilled in the art without departing from the essential scope or spirit of my invention, and accordingly, it is intended to claim the same broadly as well as specifically as indicated by the appended claims.

What is claimed as new and useful is:

1. The method of making a pressurized package of liquid instant coffee concentrate for subsequent dispensing by the consumer as desired in which the package interior contacted by the package contents is fabricated of substances which are insoluble in and chemically inert with respect to the coffee concentrate and pressurizing medium, consisting of the steps of, preparing the liquid coffee concentrate and immediately stabilizing the soluble solids of the concentrate at a reading of 30 on the Brix scale, partially filling an open-topped preconditioned container with a predetermined quantity of the stabilized concentrate, the container preconditioning consisting of the steps of first mechanically removing all dust and other particles adhering to the container parts and then autoclaving the container parts to sterilize the same, checking the weight of the partially filled container to insure that the predetermined quantity of concentrate has actually been deposited in the container, securing a valve assembly including a dip tube to the container to seal the open top of the latter, inverting the container and drawing a vacuum through the valve assembly and dip tube to thereby substantially completely exhaust all air within the partially filled container, pressurizing the concentrate in the container by injecting a gas which is inert relative to the concentrate into the container interior through the valve assembly and bringing the pressure level to a minimum of ninety pounds per square inch, checking the gas pressure within the container to insure that the pressure level is at least at the minimum desired level, testing the container for gas leaks by completely immersing the container in a fluid bath and inspecting for bubbles escaping from the container, removing the container from the bath and drying the same by exposing the container to a high velocity stream of heated air, and then applying to the container a valve spout through which the concentrate is dispensable when the valve is opened.

2. The method of making a pressurized package of liquid instant coffee concentrate for subsequent dispensing by the consumer as desired in which the package interior contacted by the package contents is fabricated of substances which are insoluble in and chemically inert with respect to the coffee concentrate and pressurizing medium, consisting of the steps of, preparing the liquid coffee concentrate and immediately stabilizing the soluble solids of the concentrate tank at a reading of 30 on the Brix scale, partially filling an open-topped preconditioned container with a predetermined quantity of the stabilized concentrate, the container preconditioning consisting of the steps of first mechanically removing all dust and other particles adhering to the container parts and then autoclaving the container parts to sterilize the same, checking the weight of the partially filled container to insure that the predetermined quantity of concentrate has actually been deposited in the container, sealing off the container interior from the ambient atmosphere, drawing a vacuum within the sealed off container to exhaust the air in the container, flooding the exhausted container with a gas which is inert relative to the concentrate in the container and then re-vacuumizing the container to exhaust the gas to purge any remaining residual air therefrom and thereafter securing a valve assembly including a dip tube to the container to seal the open top of the latter while the container is sealed off from the ambient atmosphere, returning the container to ambient atmosphere, inverting the container and pressurizing the concentrate in the container by injecting a gas which is inert relative to the concentrate into the container interior through the valve assembly and bringing the pressure level to a minimum of ninety pounds per square inch, checking the gas pressure within the container to insure that the pressure level is at least at the minimum desired level, testing the container for gas leaks by completely immersing the container in a fluid bath and inspecting for bubbles escaping from the container, removing the container from the bath and drying the same by exposing the container to a high velocity stream of heated air, and then applying to the container a valve spout through which the concentrate is dispensable when the valve is opened.

3. The method of making a pressurized package of liquid instant coffee concentrate for subsequent dispensing by the consumer as desired in which the package interior contacted by the package contents is fabricated of substances which are insoluble in and chemically inert with respect to the coffee concentrate and pressurizing medium, consisting of the steps of, roasting and grinding the coffee beans and then extracting the coffee concentrate from the ground beans by passing through the latter water at a temperature of substantially 180° Fahrenheit, collecting the concentrate and stabilizing the soluble solids therein at a predetermined level, partially filling a sterilized container with the stabilized concentrate, removing any air remaining in the unfilled portion of the contianer and then pressurizing the container with a medium which is chemically inert with respect to the concentrate and the interior of the container, the aforesaid steps being sequentially carried out within a continuous time interval of sufficiently short duration that substantially no chemical changes take place in any of the roasted coffee, the ground coffee beans and in the extracted concentrate due to contact with air.

4. The method of making a pressurized package of liquid instant coffee concentrate for subsequent dispensingly by the consumer as desired in which the package interior contacted by the package contents is fabricated of substances which are insoluble in and chemically inert with respect to the coffee concentrate and pressurizing medium, consisting of the steps of, roasting and grinding the coffee beans, steaming the ground coffee with steam at a gauge pressure of not more than 150 pounds per square inch and at a temperature between 212° and 360° Fahrenheit until the steam has penetrated each coffee particle, and then extracting the coffee concentrate from the moist steamed ground beans by passing through the latter water at a temperature of substantially 180° Fahrenheit, collecting the concentrate and stabilizing the soluble solids therein at a predetermined level, partially filling a sterilized container with the stabilized concentrate, removing any air remaining in the unfilled portion of the container and then pressurizing the container with a medium which is chemically inert with respect to the concentrate and the interior of the container, the aforesaid steps being sequentially carried out within a continuous time interval of sufficiently short duration that substantially no chemical changes take place in any of the roasted coffee, the ground coffee beans and in the extracted concentrate due to contact with air.

References Cited in the file of this patent

UNITED STATES PATENTS

| | | |
|---|---|---|
| 2,631,814 | Abplanalp | Mar. 14, 1953 |
| 2,819,116 | Abplanalp | Jan. 7, 1958 |
| 2,874,629 | Kahan | Feb. 24, 1959 |
| 2,921,722 | Focht | Jan. 19, 1960 |
| 2,932,434 | Abplanalp | Apr. 12, 1960 |

OTHER REFERENCES

"Food Engineering," May 1958, pages 64–67.
"Food Engineering," February 1959, pages 62, 63.